(12) United States Patent
Liao (10) Patent No.: US 12,362,083 B2
(45) Date of Patent: Jul. 15, 2025

(54) MAGNETIC DEVICE

(71) Applicant: CYNTEC CO., LTD., Hsinchu (TW)

(72) Inventor: Yu-Lin Liao, Hsinchu (TW)

(73) Assignee: CYNTEC CO., LTD., Hsinchu (TW)

( * ) Notice: Subject to any disclaimer, the term of this patent is extended or adjusted under 35 U.S.C. 154(b) by 258 days.

(21) Appl. No.: 18/143,087

(22) Filed: May 4, 2023

(65) Prior Publication Data

US 2023/0360833 A1    Nov. 9, 2023

Related U.S. Application Data

(60) Provisional application No. 63/338,444, filed on May 4, 2022.

(51) Int. Cl.
| | | |
|---|---|---|
| *H01F 1/14* | (2006.01) | |
| *F21V 8/00* | (2006.01) | |
| *H01F 1/16* | (2006.01) | |
| *H01F 7/127* | (2006.01) | |
| *H01F 41/06* | (2016.01) | |
| *H01R 13/717* | (2006.01) | |

(52) U.S. Cl.
CPC ........... *H01F 1/143* (2013.01); *G02B 6/0015* (2013.01); *G02B 6/0073* (2013.01); *H01F 1/16* (2013.01); *H01F 7/127* (2013.01); *H01F 41/06* (2013.01); *H01R 13/7175* (2013.01)

(58) Field of Classification Search
CPC . H01F 1/143; H01F 1/16; H01F 7/127; H01F 41/06; H01F 19/02; G02B 6/0015; G02B 6/0073; H01R 13/7175; H04R 9/04; H04R 9/06
See application file for complete search history.

(56) References Cited

U.S. PATENT DOCUMENTS

2015/0348707 A1* 12/2015 Hsieh ..................... H01F 27/00
                                                       29/17.2

* cited by examiner

Primary Examiner — Mohamad A Musleh
(74) Attorney, Agent, or Firm — Min-Lee Teng (57) ABSTRACT

A magnetic device having a first coil and a second coil, wherein the first coil is wound in a first direction when viewed from the first terminal part of the first coil, and the second coil is wound in a second direction when viewed from the third terminal part of the second coil, wherein the first direction and the second direction are opposite to each other for canceling magnetic fluxes generated by the first coil and the second coil.

20 Claims, 9 Drawing Sheets

|  | Result (dBuV) | | Improvement (dBuV) | |
|---|---|---|---|---|
|  | BATT | GND | BATT | GND |
| Conventional | 53.64 | 54.78 | - | - |
| Present Invention | 29.86 | 33.44 | 23.78 | 21.34 |

FIG. 5B

MAGNETIC DEVICE

CROSS-REFERENCES TO RELATED APPLICATIONS

This application claims the benefit of U.S. Provisional Patent Application No. 63/338,444, filed on May 4, 2022, which is hereby incorporated by reference herein and made a part of the specification.

BACKGROUND OF THE INVENTION

I. Field of the Invention

The present invention relates to a magnetic device, and in particular, to a magnetic device having two coils used in a circuit for transmitting audio signals.

II. Description of Related Art

The conventional circuit uses a differential amplifier to receive a pair of input audio signals, and the differential amplifier outputs a pair of audio signals to drive a speaker via a magnetic device having two coils. However, such a conventional magnetic device having two coils for transmitting audio signals will cause a larger EMI when the differential amplifier receives two audio signals having the same phase.

Therefore, a better solution is needed to resolve the above-mentioned issues.

SUMMARY OF THE INVENTION

One objective of the present invention is to provide a magnetic device having two coils for transmitting a pair of audio signals with lower EMI.

In one embodiment of the present invention, a magnetic device is disclosed, wherein the magnetic device comprises: a body, comprising a top surface and a bottom surface; a first conductive wire, wherein the first conductive wire comprises a first terminal part, a second terminal part and at least one first winding turn to form a first coil, wherein the at least one first winding turn of the first coil is disposed in the body; a second conductive wire, wherein the second conductive wire comprises a third terminal part, a fourth terminal part and at least one first winding turn to form a second coil, wherein the at least one second winding turn of the second coil is disposed in the body, wherein each of the first coil and the second coil is wound around a straight line; and a first electrode, a second electrode, a third electrode, and a fourth electrode, wherein the first terminal part is electrically connected to the first electrode, the second terminal part is electrically connected to the second electrode, the third terminal part is electrically connected to the third electrode, and the fourth terminal part is electrically connected to the fourth electrode, wherein the first terminal part and the second terminal part do not cross over each other, and the third terminal part and the fourth terminal part cross over each other, wherein a first line segment passing through the first electrode and the third electrode does not cross over a second line segment passing through the second electrode and the fourth electrode within the boundary of the bottom surface of the body, wherein the first coil is wound in a first direction when viewed from the first terminal part of the first coil, and the second coil is wound in a second direction when viewed from the third terminal part of the second coil, wherein the first direction and the second direction are opposite to each other.

In one embodiment, the first winding direction is clockwise and the second winding direction is counter-clockwise.

In one embodiment, the first winding direction is counter-clockwise and the second winding direction is clockwise.

In one embodiment, the first electrode and the third electrode are input nodes, and the second electrode and the fourth electrode are output nodes, wherein the first coil is wound in a clockwise direction when viewed from the first terminal part, and the second coil is wound in a counter-clockwise direction when viewed from the third terminal part.

In one embodiment, the first electrode and the third electrode are output nodes, and the second electrode and the fourth electrode are input nodes, wherein the first coil is wound in a counter-clockwise direction when viewed from the second terminal part, and the second coil is wound in a clockwise direction when viewed from the fourth terminal part.

In one embodiment, the body comprises a first magnetic body and a second magnetic body, wherein the first coil is disposed in the first magnetic body and the second coil is disposed in the second magnetic body, wherein the first magnetic body and the second magnetic body are attached by an adhesive material.

In one embodiment, the first magnetic body and the second magnetic body are made of the same magnetic material.

In one embodiment, the first electrode and the third electrode are coupled to an amplifier, wherein the first electrode and the third electrode are respectively coupled to a first terminal for receiving a first signal and a second terminal for receiving a second signal, wherein the first signal and the second signal have a same phase.

In one embodiment, each of the first signal and the second signal is an audio signal.

In one embodiment, the amplifier is a differential amplifier.

In one embodiment, the first electrode comprises a first lead frame that is disposed on a first lateral surface and extended to the bottom surface of the body.

In one embodiment, the second electrode comprises a second lead frame that is disposed on the first lateral surface and extended to the bottom surface of the body.

In one embodiment, the third electrode comprises a third lead frame that is disposed on a second lateral surface and extended to the bottom surface of the body, wherein the first lateral surface and the second lateral surface are two opposite surfaces of the body.

In one embodiment, the fourth electrode comprises a fourth lead frame that is disposed on the second lateral surface and extended to the bottom surface of the body.

In one embodiment, the first conductive wire is a round wire, a flat wire or a square wire.

In one embodiment, the amplifier is a class-D audio amplifier.

In one embodiment, a mylar sheet is disposed on the top surface of the body.

In one embodiment, the differential amplifier outputs a third signal and a fourth signal, wherein the third signal is coupled to the first electrode via a first deadtime delay and an H-bridge.

In one embodiment, the fourth signal is coupled to the third electrode via a second deadtime delay and the H-bridge.

In one embodiment, the third terminal part and the fourth terminal part of the second coil cross over each other and are electrically connected to the first electrode and the third electrode, respectively.

In one embodiment, an insulating layer encapsulates the body.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention.

DESCRIPTION OF EMBODIMENTS

Figure 1A:
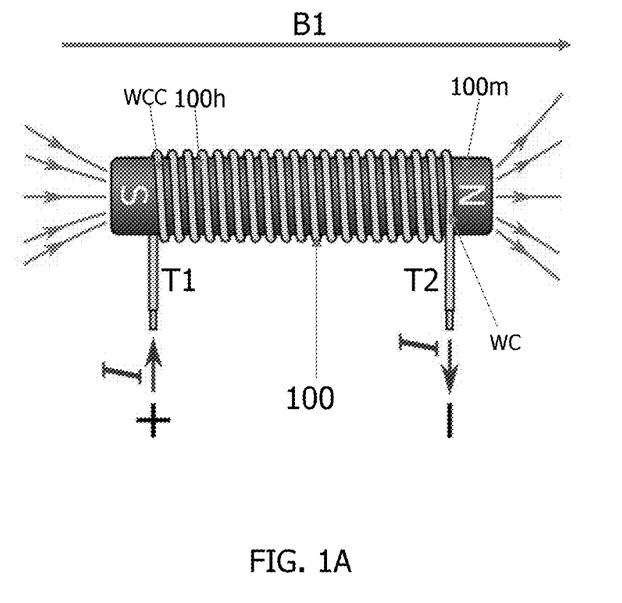
FIG. 1A shows a top view of a coil having a current flowing from a first terminal to a second terminal of the coil.
Figure 1B:
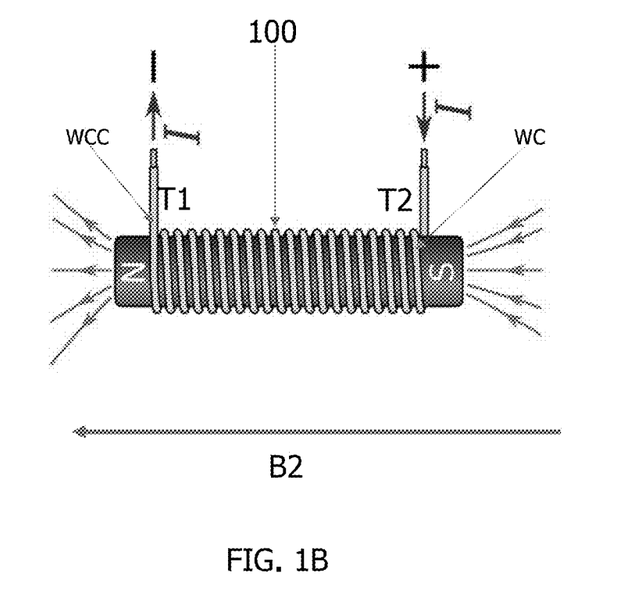
FIG. 1B shows a top view of the coil having a current flowing from the second terminal to the first terminal of the coil.

FIG. 1A depicts a top view of a coil 100 having a first terminal part T1 and a second terminal part T2, and FIG. 1B depicts a top view of the coil 100 having the first terminal part T1 and the second terminal part T2, wherein the coil 100 forms a hollow space 100h, and a magnetic core 100m is disposed in the hollow space 100h, wherein the coil 100 is wound in a first winding direction WCC when viewed from the first terminal part T1, and the coil 100 is wound in a second winding direction WC when viewed from the second terminal part T2. As shown in FIG. 1A, the first winding direction WCC of coil 100, when viewed from the first terminal part T1, is counter-clockwise, and the second winding direction WC of coil 100, when viewed from the second terminal part T2, is clockwise. As shown in FIG. 1A, when current I is flowing from the first terminal part T1 to the second terminal part T2, the current I is flowing in a counter-clockwise direction, and therefore the magnetic flux B1 is flowing in a direction from left to the right. However, as shown in FIG. 1B, when current I is flowing from the second terminal part T2 to the first terminal part T1, the current I will be flowing in a clockwise direction, and therefore the magnetic flux B2 is flowing in a direction from right to the left.

Figure 2:
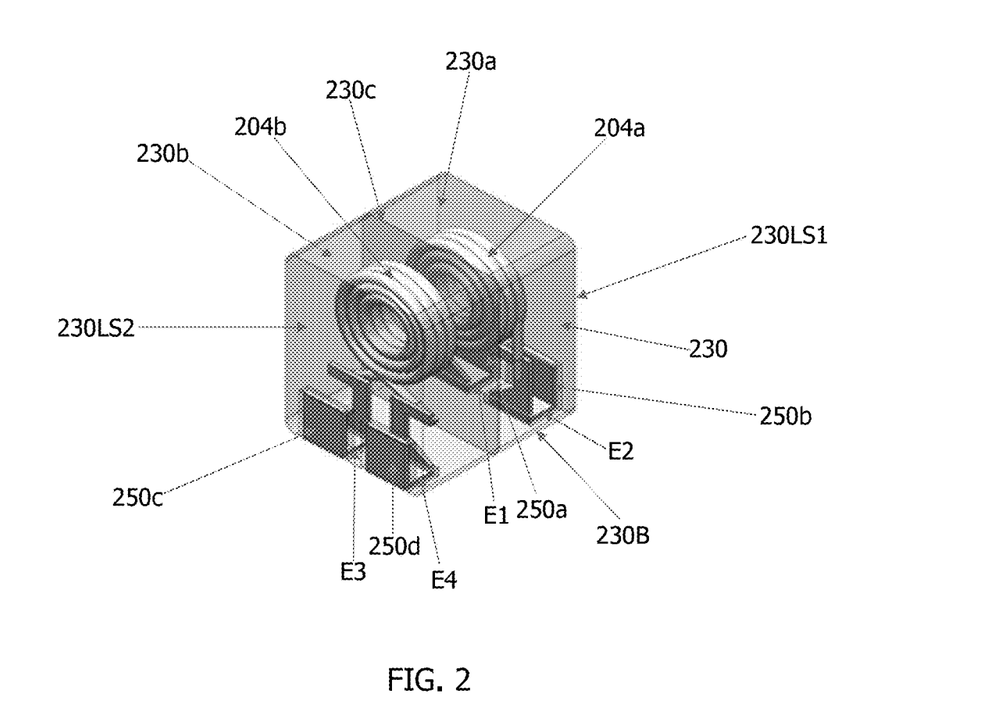
FIG. 2 shows a top view of a magnetic device according to one embodiment of the present invention.
Figure 3A:
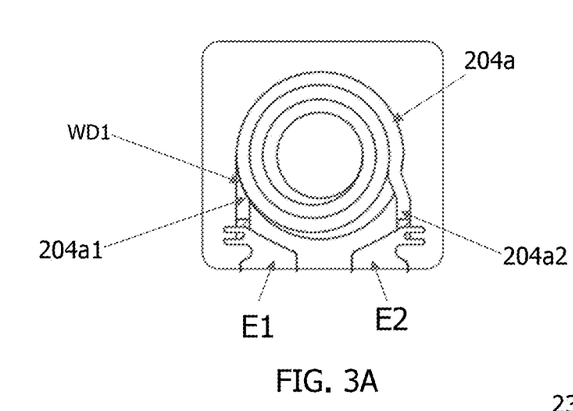
FIG. 3A depicts a top view of the first coil of the magnetic device in FIG. 2.
Figure 3B:
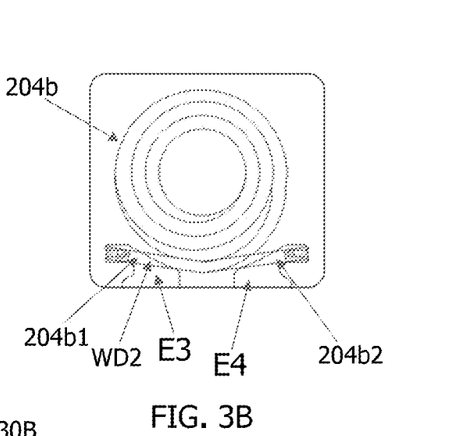
FIG. 3B depicts a top view of the second coil of the magnetic device in FIG. 2.
Figure 3C:
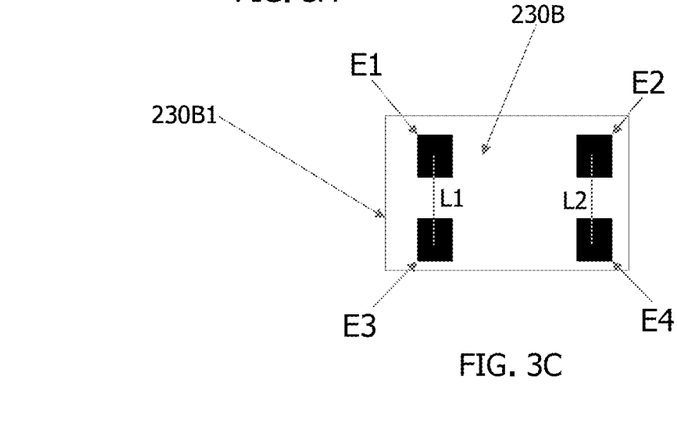
FIG. 3C depicts the bottom surface of the body of the magnetic device in FIG. 2.

FIG. 2 depicts a top view of a magnetic device 200 according to one embodiment of the present invention. FIG. 3A depicts a top view of a first coil 204a of the magnetic device 200, FIG. 3B depicts a top view of the second coil 204b of the magnetic device 200, and FIG. 3C, depicts a bottom surface 230B of a body 230 of the magnetic device 200. Please refer to FIG. 2, FIG. 3A-3C together, wherein the magnetic device 200 comprises a body 230 comprising a top surface and a bottom surface 230B; a first conductive wire, wherein the first conductive wire comprises a first terminal part 204a1, a second terminal part 204a2, and at least one first winding turn to form a first coil 204a, wherein the at least one first winding turn of the first coil 204a is disposed in the body 230; a second conductive wire, wherein the second conductive wire comprises a third terminal part 204b1, a fourth terminal part 204b2, and at least one second winding turn to form a second coil 204b, wherein the at least one second winding turn of the second coil 204b is disposed in the body 230; and a first electrode E1, a second electrode E2, a third electrode E3, and a fourth electrode E4, wherein the first terminal part 204a1 is electrically connected to the first electrode E1, the second terminal part 204a2 is electrically connected to the second electrode E2, the third terminal part 204b1 is electrically connected to the third electrode E3, and the fourth terminal part 204b2 is electrically connected to the fourth electrode E4, wherein a first straight-line segment L1 passing through the first electrode E1 and the third electrode E3 does not cross over a second straight-line segment L2 passing through the second electrode E2 and the fourth electrode E4 within the boundary 230B1 of the bottom surface 230B of the body 230, as shown in FIG. 3C, wherein the first coil 204a is wound in a first winding direction WD1 when viewed from the first terminal part 204a1 of the first coil 204a, and the second coil 204b is wound in a second winding direction WD2 when viewed from the third terminal part 204b1 of the second coil 204b, wherein the first winding direction WD1 and the second winding direction WD2 are opposite to each other.

In one embodiment, the first terminal part 204a1 is soldered to the first electrode E1, the second terminal part 204a2 is soldered to the second electrode E2, the third terminal part 204b1 is soldered to the third electrode E3, and the fourth terminal part 204b2 is soldered to the fourth electrode E4.

In one embodiment, the first terminal part 204a1 is adhered to the first electrode E1, the second terminal part 204a2 is adhered to the second electrode E2, the third terminal part 204b1 is adhered to the third electrode E3, and the fourth terminal part 204b2 is adhered to the fourth electrode E4.

In one embodiment, the first winding direction WD1 is clockwise, and the second winding direction WD2 is counter-clockwise.

In one embodiment, the first winding direction WD1 is counter-clockwise, and the second winding direction WD2 is clockwise.

In one embodiment, the third terminal part 204b1 and the fourth terminal part 204b2 cross over each other and are electrically connected to the third electrode E3 and the fourth electrode E4, respectively, as shown in FIG. 3B.

In one embodiment, the second coil 204b is the same as the first coil 204a, but the second coil 204b is rotated 180 degrees with respect to the first coil 204a such that the terminal part of the first coil 204a connected to the first electrode and the terminal part of the second coil 204*b* connected to the third electrode will have two opposite winding directions when viewed from said terminal part of the first coil 204*a* connected to the first electrode and said terminal part of the second coil 204*b* connected to the third electrode, respectively.

In one embodiment, the first electrode E1 and the third electrode E3 are input nodes, and the second electrode E2 and the fourth electrode E4 are output nodes, wherein the first coil 204*a* is wound in a clockwise direction when viewed from the first terminal part 204*a*1, and the second coil 204*b* is wound in a counter-clockwise direction when viewed from the third terminal part 204*b*1.

In one embodiment, the first electrode E1 and the third electrode E3 are output nodes, and the second electrode E2 and the fourth electrode E4 are input nodes, wherein the first coil 204*a* is wound in a counter-clockwise direction when viewed from the second terminal part 204*a*2, and the second coil 204*b* is wound in a clockwise direction when viewed from the fourth terminal part 204*b*2.

In one embodiment, as shown in FIG. 2, the body 230 comprises a first magnetic body 230*a* and a second magnetic body 230*b*, wherein the first coil 204*a* is disposed in the first magnetic body 230*a* and the second coil 204*b* is disposed in the second magnetic body 230*b*, wherein the first magnetic body 230*a* and the second magnetic body 230*b* are attached to each other by an adhesive material 230*c*.

In one embodiment, the first magnetic body 230*a* and the second magnetic body 230*b* are made of a same magnetic material.

In one embodiment, the first magnetic body 230*a* and the second magnetic body 230*b* are integrated formed.

In one embodiment, an insulating layer encapsulates the body 230.

In one embodiment, as shown in FIG. 2, the first electrode E1 comprises a first lead frame 250*a* that is disposed on a first lateral surface 230LS1 and extended to the bottom surface 230B of body 230.

In one embodiment, as shown in FIG. 2, the second electrode E2 comprises a second lead frame 250*b* that is disposed on the first lateral surface 230LS1 and extended to the bottom surface 230B of body 230.

In one embodiment, as shown in FIG. 2, the third electrode E3 comprises a third lead frame 250*c* that is disposed on a second lateral surface 230LS2 and extended to the bottom surface 230B of body 230, wherein the first lateral surface 230LS1 and the second lateral surface 230LS2 are two opposite surfaces of the body 230.

In one embodiment, as shown in FIG. 2, the fourth electrode E4 comprises a fourth lead frame 250*d* that is disposed on the second lateral surface 230LS2 and extended to the bottom surface of body 230B.

In one embodiment, the first conductive wire forming the first coil 204*a* is a round wire, a flat wire or a square wire.

In one embodiment, the second conductive wire forming the second coil 204*b* is a round wire, a flat wire or a square wire.

Figure 3D:
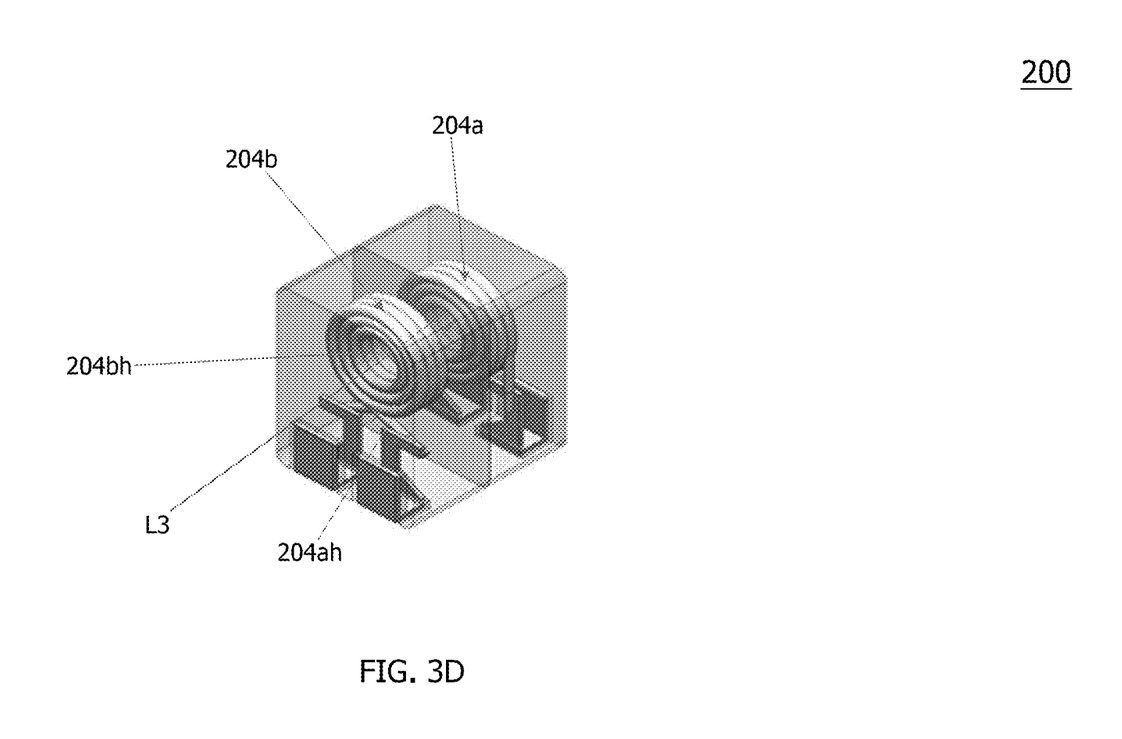
FIG. 3D shows a top view of a magnetic device according to one embodiment of the present invention.

In one embodiment, as shown in FIG. 3D, each of the first coil 204*a* and the second coil 204*b* is wound around a straight line L3. That is, the straight line L3 passes through the hollow space 204*ah* of the first coil 204*a* and the hollow space 204*bh* of the second coil 204*b*.

In one embodiment, as shown in FIG. 3D, the straight line L3 is a horizontal line.

In one embodiment, the straight line L3 is a vertical line.

Figure 3E:
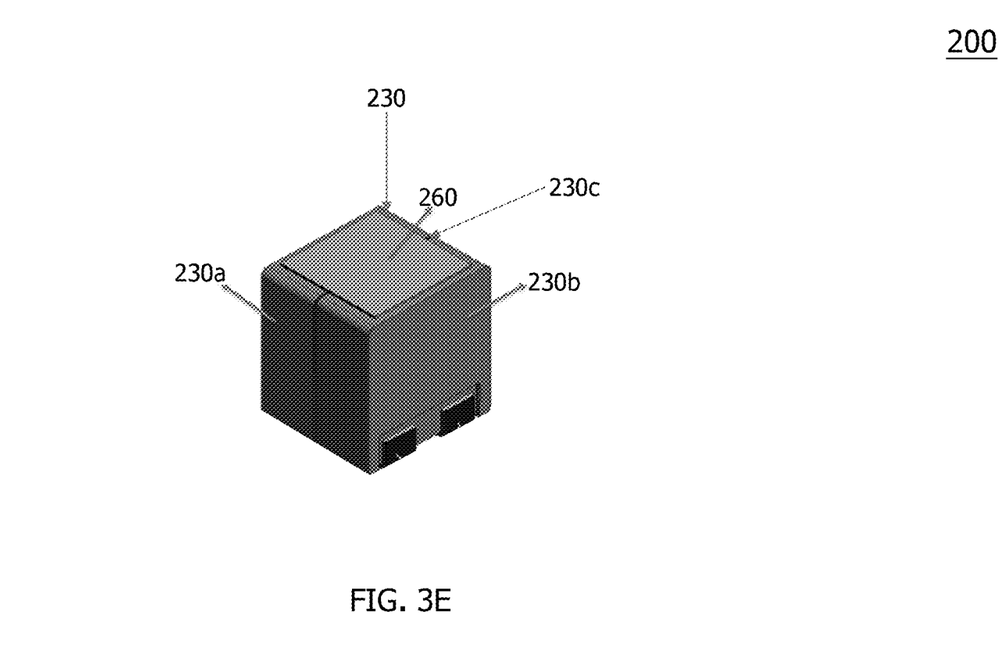
FIG. 3E shows a top view of a magnetic device according to one embodiment of the present invention.

In one embodiment, as shown in FIG. 3E, a mylar sheet 260 is disposed on a top surface of the body 230 that comprises the first magnetic body 230*a*, the second magnetic body 230*b* and the adhesive material 230*c*.

Figure 4:
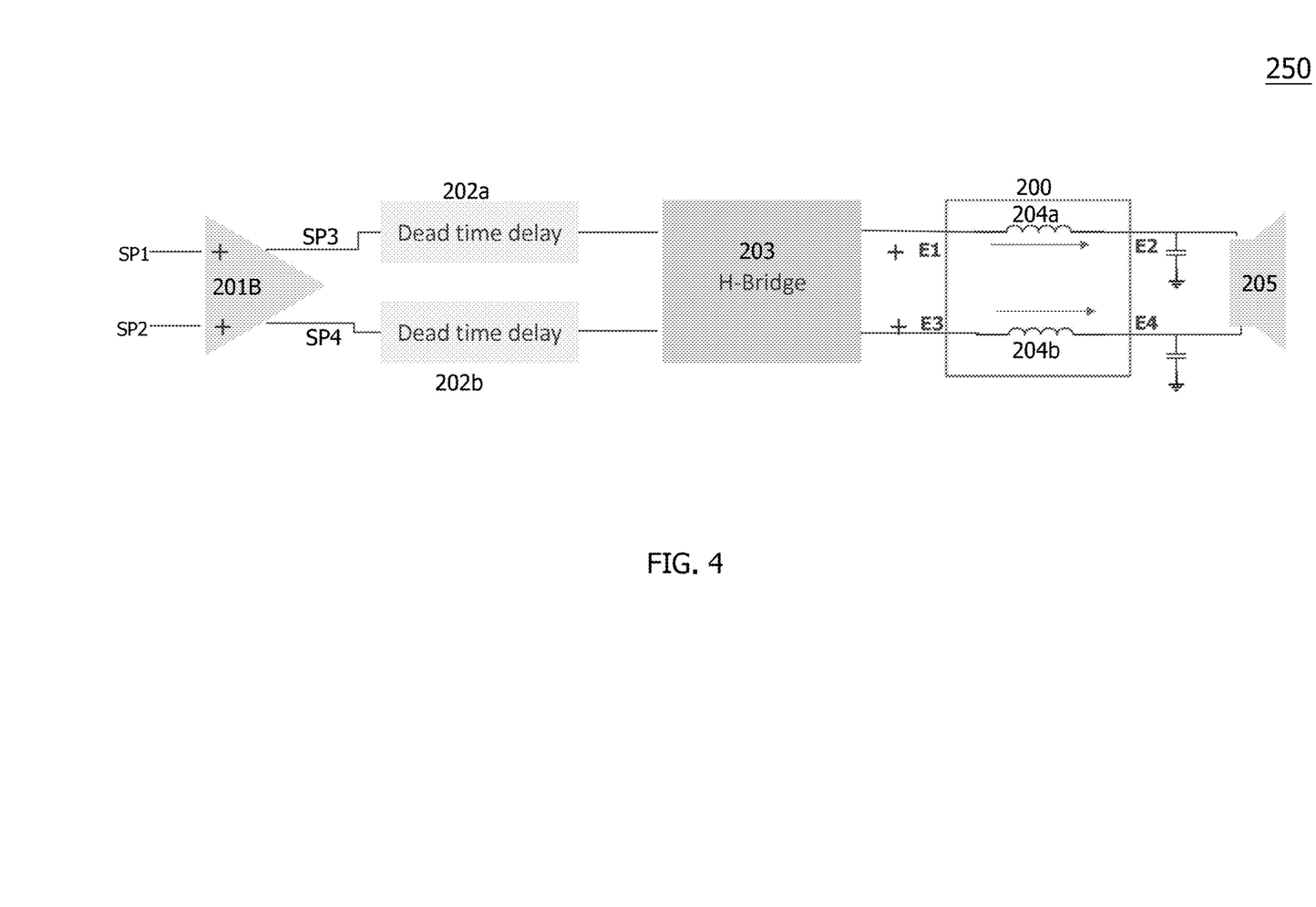
FIG. 4 shows a circuit comprising a magnetic device for driving a speaker according to one embodiment of the present invention.

FIG. 4 depicts a schematic of a circuit 250, wherein the magnetic device 200 is coupled to an amplifier 201B via an H-bridge 203 and dead time delay 202*a*, 202*b*; and the magnetic device 200 outputs signals to a speaker 205.

In one embodiment, the first electrode E1 and the third electrode E3 are coupled to an amplifier 201B, wherein the first electrode E1 and the third electrode E3 are respectively coupled to a first terminal of the amplifier 201B for receiving a first signal SP1 and a second terminal of the amplifier 201B for receiving a second signal SP2, wherein the first signal SP1 and the second signal SP2 have a same phase.

In one embodiment, each of the first signal SP1 and the second signal SP2 is an audio signal.

In one embodiment, the amplifier 201B is a differential amplifier.

In one embodiment, the amplifier 201B is a class-D audio amplifier.

In one embodiment, the differential amplifier 201B output a third signal SP3 and a fourth signal SP4, wherein the third signal SP3 is coupled to the first electrode E1 via a first deadtime delay 202*a* and an H-bridge 203.

In one embodiment, the fourth signal SP4 is coupled to the third electrode E3 via a second deadtime delay 202*b* and the H-bridge 203.

Figure 5A:
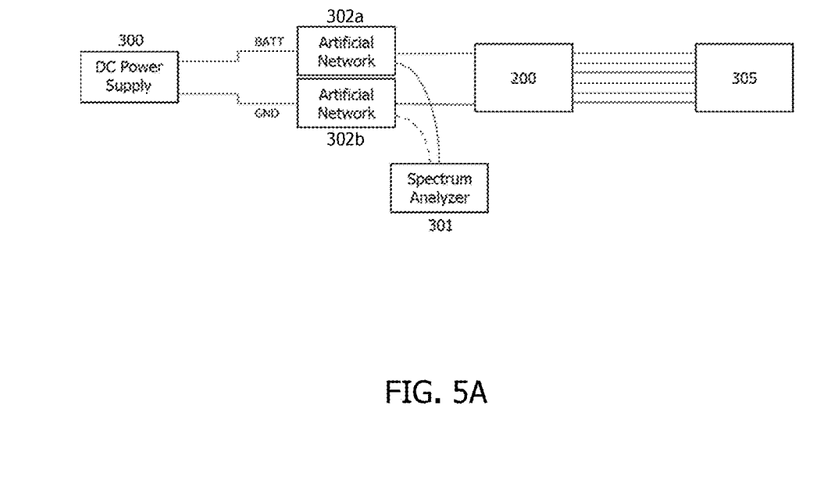
FIG. 5A shows a circuit for testing a magnetic device according to one embodiment of the present invention.

FIG. 5A shows a circuit 250 for EMC testing, wherein a magnetic device 200 is coupled to DC power supply 300 via artificial networks 302*a*, 302*b*, and the magnetic device 200 outputs audio signals to a speaker 305, wherein a spectrum analyzer 301 is connected to the artificial networks 302*a*, 302*b* to measure the spectrum signals at the battery node BATT and the ground node GND, respectively.

Figure 5B:
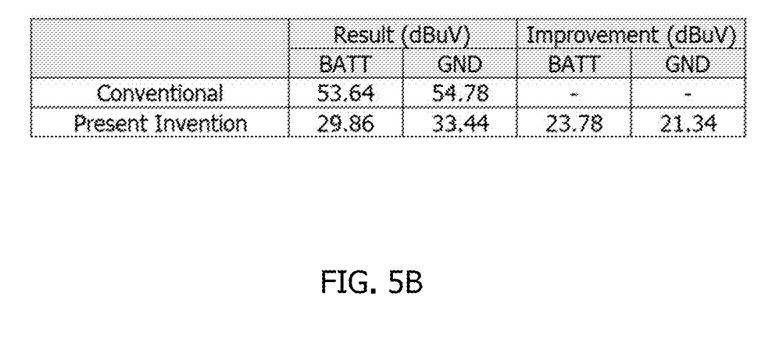
FIG. 5B shows the results of the testing based on the circuit in FIG. 5A.

FIG. 5B shows the EMC testing results based on the circuit in FIG. 5A. As shown in FIG. 5B, for a conventional magnetic device, the EMC spectrum signal measured at the battery node BATT is 53.64 (dBuV), and the EMC spectrum signal measured at the ground node GND is 54.78 (dBuV). However, for a magnetic device 200 of the present invention, the EMC spectrum signal measured at the battery node BATT is 29.86 (dBuV) which is lower than the conventional magnetic device by 23.78 (dBuV), and the EMC spectrum signal measured at the ground node GND is 33.44 (dBuV) which is lower than the conventional magnetic device by 21.34 (dBuV), as shown in FIG. 5B.

Although the present invention has been described with reference to the above embodiments, it will be apparent to one of ordinary skill in the art that modifications to the described embodiment may be made without departing from the spirit of the invention. Accordingly, the scope of the invention will be defined by the attached claims, not by the above-detailed descriptions.

What is claimed is:

1. A magnetic device, comprising:
a body, comprising a top surface and a bottom surface;
a first conductive wire, wherein the first conductive wire comprises a first terminal part, a second terminal part, and at least one first winding turn to form a first coil, wherein the at least one first winding turn of the first coil is disposed in the body;
a second conductive wire, wherein the second conductive wire comprises a third terminal part, a fourth terminal part, and at least one second winding turn to form a second coil, wherein the at least one second winding turn of the second coil is disposed in the body, wherein a straight line passes through a first hollow space of the first coil and a second hollow space of the second coil; and a first electrode, a second electrode, a third electrode, and a fourth electrode, wherein the first terminal part is electrically connected to the first electrode, the second terminal part is electrically connected to the second electrode, the third terminal part is electrically connected to the third electrode, and the fourth terminal part is electrically connected to the fourth electrode, wherein a first straight-line segment passing through the first electrode and the third electrode does not cross over a second straight-line segment passing through the second electrode and the fourth electrode within the boundary of the bottom surface of the body, wherein the first coil is wound in a first direction when viewed from the first terminal part, and the second coil is wound in a second direction when viewed from the third terminal part, wherein the first direction and the second direction are opposite to each other.

2. The magnetic device according to claim 1, wherein the first direction is a clockwise direction and the second direction is a counter-clockwise direction.

3. The magnetic device according to claim 1, wherein the first direction is a counter-clockwise direction and the second direction is a clockwise direction.

4. The magnetic device according to claim 1, wherein the first electrode and the third electrode are input nodes, and the second electrode and the fourth electrode are output nodes, wherein the first coil is wound in a clockwise direction when viewed from the first terminal part, and the second coil is wound in a counter-clockwise direction when viewed from the third terminal part.

5. The magnetic device according to claim 1, wherein the first electrode and the third electrode are output nodes, and the second electrode and the fourth electrode are input nodes, wherein the first coil is wound in a counter-clockwise direction when viewed from the second terminal part, and the second coil is wound in a clockwise direction when viewed from the fourth terminal part.

6. The magnetic device according to claim 1, wherein the body comprises a first magnetic body and a second magnetic body, wherein the first coil is disposed in the first magnetic body and the second coil is disposed in the second magnetic body, wherein the first magnetic body and the second magnetic body are attached to each other by an adhesive material.

7. The magnetic device according to claim 6, wherein the first magnetic body and the second magnetic body are made of a same magnetic material.

8. The magnetic device according to claim 4, wherein the first electrode and the third electrode are coupled to an amplifier, wherein the first electrode and the third electrode are respectively coupled to a first terminal for receiving a first signal and a second terminal for receiving a second signal, wherein the first signal and the second signal have a same phase.

9. The magnetic device according to claim 8, wherein each of the first signal and the second signal is an audio signal.

10. The magnetic device according to claim 8, wherein the amplifier is a differential amplifier.

11. The magnetic device according to claim 1, wherein the first electrode comprises a first lead frame that is disposed on a first lateral surface and extended to the bottom surface of the body.

12. The magnetic device according to claim 11, wherein the second electrode comprises a second lead frame that is disposed on the first lateral surface and extended to the bottom surface of the body.

13. The magnetic device according to claim 12, wherein the third electrode comprises a first third lead frame that is disposed on a second lateral surface and extended to the bottom surface of the body, wherein the first lateral surface and the second lateral surface are two opposite surfaces of the body.

14. The magnetic device according to claim 13, wherein the fourth electrode comprises a fourth lead frame that is disposed on the second lateral surface and extended to the bottom surface of the body.

15. The magnetic device according to claim 1, wherein the first conductive wire is a round wire, a flat wire or a square wire.

16. The magnetic device according to claim 8, wherein the amplifier is a class-D audio amplifier.

17. The magnetic device according to claim 6, wherein a mylar sheet is disposed on the top surface of the body.

18. The magnetic device according to claim 10, wherein the differential amplifier outputs a third signal and a fourth signal, wherein the third signal is coupled to the first electrode via a first deadtime delay and an H-bridge.

19. The magnetic device according to claim 18, wherein the fourth signal 1 is coupled to the third electrode via a second deadtime delay and the H-bridge.

20. The magnetic device according to claim 1, wherein the third terminal part and the fourth terminal part of the second coil cross over each other and are electrically connected to the first electrode and the third electrode, respectively.

* * * * *